(12) United States Patent
Al-Yagon

(10) Patent No.: US 11,703,030 B2  
(45) Date of Patent: Jul. 18, 2023

(54) YAW CONTROL DEVICE FOR A WIND TURBINE

(71) Applicant: Wind Buzz Ltd., Tel Aviv (IL)

(72) Inventor: Yossi Al-Yagon, Tel-Aviv (IL)

(73) Assignee: WIND BUZZ LTD., Tel Aviv (IL)

( * ) Notice: Subject to any disclaimer, the term of this patent is extended or adjusted under 35 U.S.C. 154(b) by 0 days.

(21) Appl. No.: 17/935,295

(22) Filed: Sep. 26, 2022

(65) Prior Publication Data

US 2023/0094813 A1    Mar. 30, 2023

Related U.S. Application Data

(60) Provisional application No. 63/250,545, filed on Sep. 30, 2021.

(51) Int. Cl.
  F03D 1/06    (2006.01)
  F03D 7/02    (2006.01)

(52) U.S. Cl.
  CPC .............. F03D 7/0204 (2013.01); F03D 1/06 (2013.01)

(58) Field of Classification Search
  CPC . F03D 1/04; F03D 1/06; F03D 7/0204; F03D 7/0208; F03D 7/0212
  See application file for complete search history.

(56) References Cited

U.S. PATENT DOCUMENTS

| | | |
|---|---|---|
| 173,368 A | 2/1876 | Strong |
| 662,939 A | 12/1900 | Jarmin |
| 1,433,995 A | 10/1922 | Fowle |
| 6,749,399 B2 * | 6/2004 | Heronemus ............... A61P 3/02 416/41 |
| 8,317,469 B2 * | 11/2012 | Kinzie ..................... F03D 1/04 415/211.2 |
| 8,668,433 B2 * | 3/2014 | Friesth ................... F03D 13/20 415/58.7 |
| 8,931,235 B2 * | 1/2015 | Baker ...................... F03D 1/02 52/651.01 |
| 10,451,044 B1 * | 10/2019 | Lentini ................... F03D 13/20 |

(Continued)

FOREIGN PATENT DOCUMENTS

GB           292917 A    10/1928

OTHER PUBLICATIONS

International Search Report for PCT Application No. PCT/IB2022/059135. The International Bureau of WIPO.

(Continued)

*Primary Examiner* — Justin D Seabe  
(74) *Attorney, Agent, or Firm* — M&B IP Analysts, LLC

(57) ABSTRACT

A yaw control device includes a bottom horizontal plate, a top horizontal plate, a first vertical plate, and a second vertical plate. An aperture is positioned between first and second edges of the bottom horizontal plate, and is closer to a third edge of the bottom horizontal plate than to a fourth edge of that plate. A bottom edge of the first vertical plate is attached to a first edge of the bottom horizontal plate. An upper edge of the first vertical plate is attached to a first edge of the top horizontal plate. A bottom edge of the second vertical plate is attached to a second edge of the bottom horizontal plate. An upper edge of the second vertical plate is attached to a second edge of the top horizontal plate. The third edges of the horizontal plates are adapted to rotate about a shaft inserted through the aperture.

19 Claims, 7 Drawing Sheets

(56) References Cited

U.S. PATENT DOCUMENTS

2006/0244264 A1 11/2006 Anderson et al.
2013/0011258 A1 1/2013 Kuo

OTHER PUBLICATIONS

Wikipedia contributors. "Yaw system." Wikipedia, The Free Encyclopedia. Wikipedia, The Free Encyclopedia, Sep. 15, 2021. Web. Jan. 17, 2023. Wikipedia contributors Sep. 15, 2021 (Sep. 15, 2021). Last accessed Jan. 27, 2023.
Written Opinion of the International Searching Authority for PCT Application No. PCT/IB2022/059135 dated Jan. 18, 2023. The International Bureau of WIPO.

* cited by examiner

YAW CONTROL DEVICE FOR A WIND TURBINE

CROSS-REFERENCE TO RELATED APPLICATIONS

This application claims the benefit of U.S. Provisional Patent Application No. 63/250,545 filed on Sep. 30, 2021, the contents of which are hereby incorporated by reference.

TECHNICAL FIELD

The present disclosure generally relates to wind turbines and, more specifically, to a yaw control device for a wind turbine.

BACKGROUND

A wind turbine is a device that converts kinetic wind energy into electrical energy through a rotary turbine connected to a generator. Wind turbines are manufactured in a wide range of vertical and horizontal configurations. The smallest turbines are used for minimal power applications, such as battery charging for auxiliary power on boats or caravans or to power traffic warning signs. Larger turbines can be used for generating contributions to a domestic power supply while selling unused power back to the utility supplier via the electrical grid.

Wind turbines are becoming an increasingly important source of renewable energy and are used by many countries as part of a strategy aimed to reduce their reliance on fossil fuels.

Known wind turbine systems are generally configured either as horizontal axis systems, where the rotating shaft attached to the blades is arranged in a horizontal direction, or as vertical axis systems, where the rotating shaft is arranged in a vertical direction. Vertical axis wind turbines rotate in the same position regardless of wind direction, whereas horizontal axis wind turbines must be rotated to be positioned to face the wind direction in order to rotate and operate efficiently.

One key disadvantage of known wind turbine systems is the inability to adequately maintain optimal placement of the rotor blades when responding to a change in wind direction.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a yaw control device. The yaw control device comprises: a bottom horizontal plate having an aperture, a first edge, a second edge, a third edge, and a fourth edge; wherein the aperture is adapted to accept therethrough a vertical shaft, wherein the aperture is positioned between the first edge and the second edge of the bottom horizontal plate, wherein the aperture is positioned closer to the third edge of the bottom horizontal plate than to the fourth edge of the bottom horizontal plate; a top horizontal plate having a first edge, a second edge, a third edge, and a fourth edge; a first vertical plate having a bottom edge and an upper edge, wherein the bottom edge of the first vertical plate is attached to the first edge of the bottom horizontal plate, wherein the upper edge of the first vertical plate is attached to the first edge of the top horizontal plate; a second vertical plate having a bottom edge and an upper edge, wherein the bottom edge of the second vertical plate is attached to the second edge of the bottom horizontal plate, wherein the upper edge of the second vertical plate is attached to the second edge of the top horizontal plate; wherein the third edge of the bottom horizontal plate and the third edge of the top horizontal plate are adapted to rotate about a longitudinal axis of the vertical shaft when the vertical shaft rotates while positioned partially in the aperture of the bottom horizontal plate.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

A yaw control device for a wind turbine includes a left vertical plate and at least a right vertical plate, a bottom horizontal plate, and a top horizontal plate. The bottom horizontal plate has an aperture that is adapted to accept therethrough a vertical shaft. The aperture is centralized between a first edge and a second edge of the bottom horizontal plate. The first aperture is positioned closer to a leading edge of the bottom horizontal plate than to a trailing edge of the bottom horizontal plate. The left vertical plate is located closer to the trailing edge of the bottom horizontal plate than to the leading edge of the bottom horizontal plate. The right vertical plate is located closer to the trailing edge of the bottom horizontal plate than to the leading edge of the bottom horizontal plate such that, upon rotation of the yaw control device, the leading edge of the bottom plate and a leading edge of the top horizontal plate trace towards a direction in which the wind is blowing.

Figure 1A:
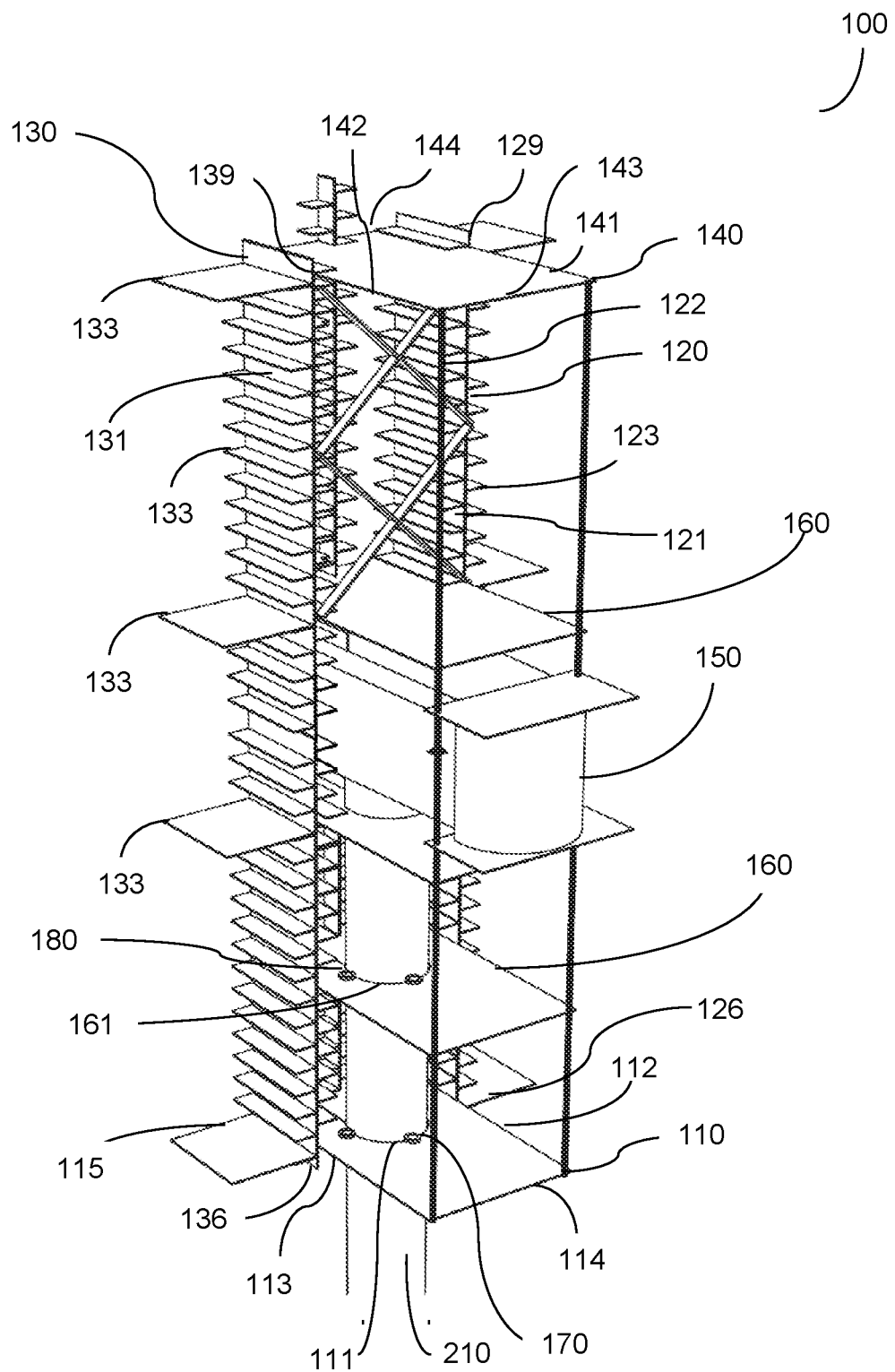
FIG. 1A is an isometric right view of a yaw control device for a wind turbine according to an embodiment.

FIG. 1A is an isometric right view of a yaw control device 100 for a wind turbine (not shown in FIG. 1A) according to an embodiment. The device 100 includes a bottom horizontal plate 110 having a first aperture 111 that is adapted to accept therethrough a vertical shaft 210. The first aperture 111 is centralized between a first edge 112 and a second edge 113 of the bottom horizontal plate 110. The bottom horizontal plate 110 further includes a leading edge 114 and a trailing edge 115. The first aperture 111 is positioned closer to the leading edge 114 of the bottom horizontal plate 110 rather than to the trailing edge 115 of the bottom horizontal plate 110.

Figure 1B:
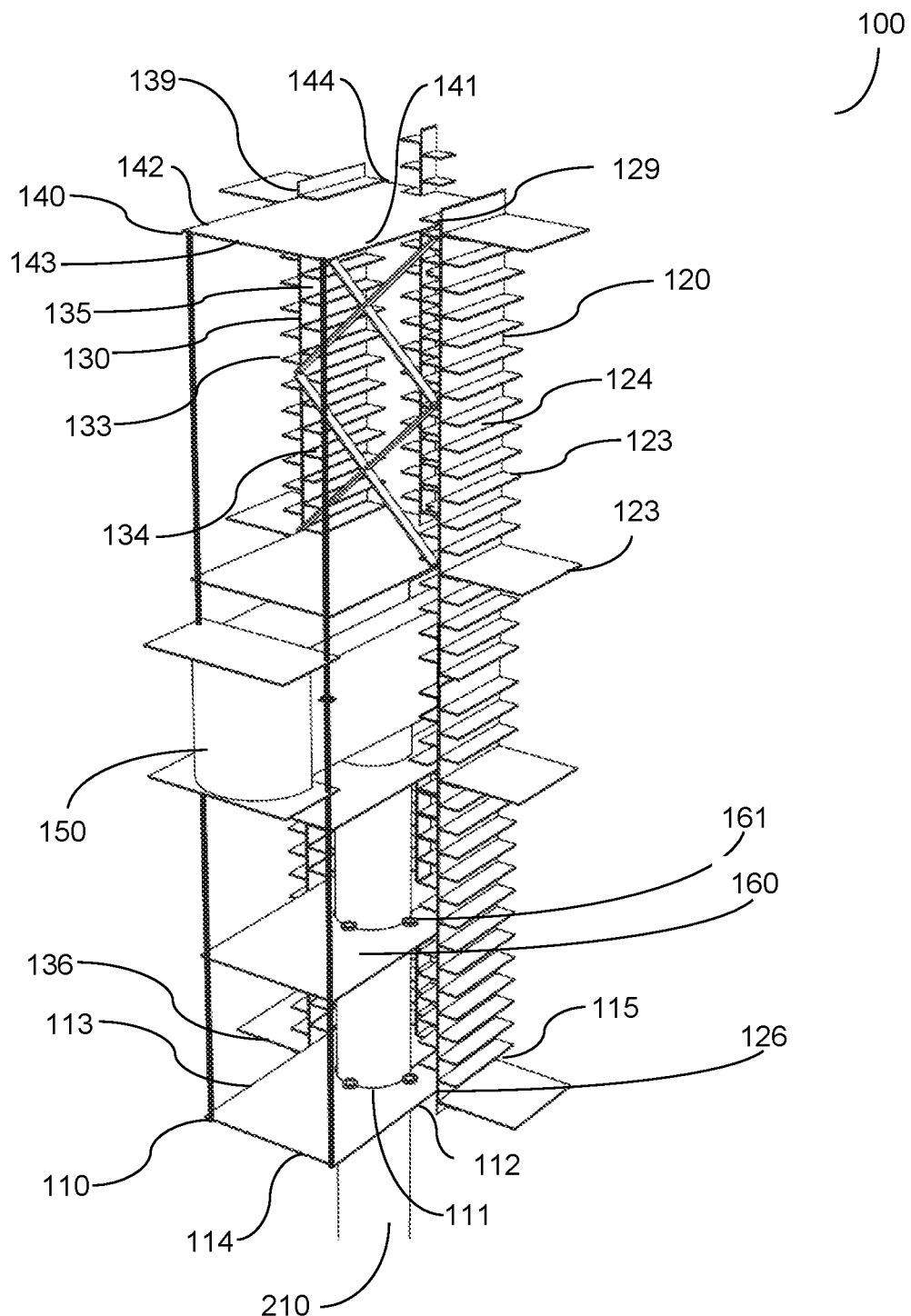
FIG. 1B is an isometric left view of a yaw control device for a wind turbine according to an embodiment.

The yaw control device 100 further includes a left vertical plate 120 having a first plurality of plates 123 extending from a first surface 124 (e.g., outer surface) (shown in FIG. 1B) of the left vertical plate 120 and a second plurality of plates 122 extending from a second surface 121 (e.g., inner surface) of the left vertical plate 120.

In an embodiment, a bottom edge 126 of the left vertical plate 120 is attached to the first edge 112 of the bottom horizontal plate 110. The first edge 112 is wider than a width of the left vertical plate 120 such that the left vertical plate 120 is located closer to the trailing edge 115 of the bottom horizontal plate 110 than to the leading edge 114 of the bottom horizontal plate 110.

In an embodiment, the yaw control device 100 further includes at least a right vertical plate 130 having a third plurality of plates 133 extending from a first surface 131 of the right vertical plate 130 and a fourth plurality of plates 134 (shown in FIG. 1B) extending from a second surface 135 (shown in FIG. 1B) of the right vertical plate 130.

In an embodiment, a bottom edge 136 of the right vertical plate 130 is attached to the second edge 113 of the bottom horizontal plate 110. The second edge 113 is wider than a width of the right vertical plate 130 such that the right vertical plate 130 is located closer to the trailing edge 115 of the bottom horizontal plate 110 rather than to the leading edge 114 of the bottom horizontal plate 110. It should be noted that the width of the right vertical plate 130 is equal to the width of the left vertical plate 120.

In an embodiment, the yaw control device 100 further includes a top horizontal plate 140 having a first edge 141, a second edge 142, a leading edge 143, and a trailing edge 144.

In an embodiment, an upper edge 129 of the left vertical plate 120 is attached to the first edge 141 (e.g., in proximity to the first edge 141) of the top horizontal plate 140 such that the upper edge 129 of the left vertical plate 120 is closer to the trailing edge 144 of the top horizontal plate 140 rather than to the leading edge 143 of the top horizontal plate 140.

In an embodiment, an upper edge 139 of the right vertical plate 130 is attached to the second edge 142 (e.g., in proximity to the second edge 142) of the top horizontal plate 140 such that the upper edge 139 of the right vertical plate 130 is closer to the trailing edge 144 of the top horizontal plate 140 rather than to the leading edge 143 of the top horizontal plate 140 such that, upon rotation of the yaw control device 100, the leading edge 114 of the bottom horizontal plate 110 and the leading edge 143 of the top horizontal plate 140 trace towards a direction in which the wind is blowing.

The yaw control device 100 is adapted to rotate such that the leading edge 114 and the leading edge 143 become oriented in a direction facing toward an approaching wind. As the wind direction changes, the leading edges 114 and 143 maintain their orientations in relation to the wind to ensure that the leading edges 114 and 143 consistently face toward the direction of the incoming wind.

It should be noted that the first plurality of plates 123 and the second plurality of plates 122 of the left vertical plate 120 and the third plurality of plates 133 and the fourth plurality of plates 134 of the right vertical plate 130, are used for increasing the friction between the vertical plates and the wind as well as to stabilize the vertical plates with respect to the wind.

In an embodiment, the yaw control device 100 further includes an electric generator 150 or other engine adapted to convert rotational motion into electric power, as further described herein below.

In an embodiment, the bottom horizontal plate 110 includes at least a first bearing 170 that is at least partially surrounding the first aperture 111. The first bearing 170 is at least positioned partially between the vertical shaft 210 and the bottom horizontal plate 110 allowing the bottom horizontal plate 110 to rotate about the vertical shaft 210.

In an embodiment, the yaw control device 100 further includes at least one horizontal stabilizing plate 160. The at least one horizontal stabilizing plate 160 may be positioned between the second surface 135 of the right vertical plate 130 and the second surface 121 of the left vertical plate 120. The at least one horizontal stabilizing plate 160 may include a second aperture 161 that is adapted to accept therethrough the vertical shaft 210.

In an embodiment, the at least one horizontal stabilizing plate 160 may include a second bearing 180 that is at least partially surrounding the second aperture 161. The second bearing 180 may be positioned between the vertical shaft 210 and the at least one horizontal stabilizing plate 160. In an embodiment, the second bearing 180 allows the at least one horizontal stabilizing plate 160 to rotate about the vertical shaft 210.

According to a further embodiment, one or more stabilizing plates or other stabilizing elements (e.g., poles) may be used for establishing a connection between the left and right vertical plates and for stabilizing the vertical plates. The stabilizing plates may be or may include, but are not limited to, horizontal stabilizing plates.

Figure 2:
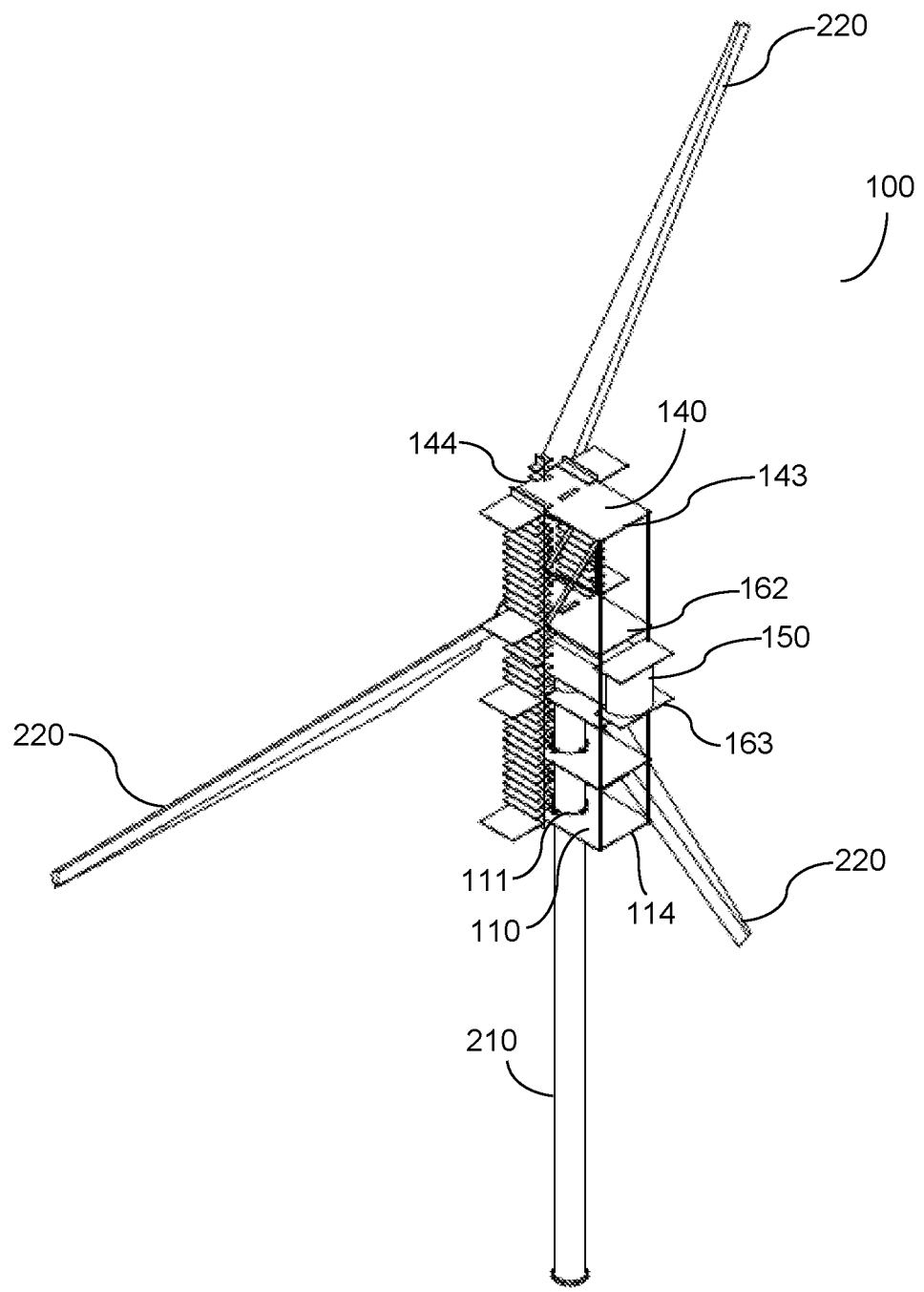
FIG. 2 is an isometric right view of a yaw control device with a wind turbine according to an embodiment.

Reference is now made to FIG. 2, which demonstrates an isometric right view of the yaw control device 100 with a wind turbine according to an embodiment.

In an embodiment, the yaw control device 100 further includes one or more rotor blades 220. In the example implementation shown in FIG. 2, the yaw control device 100 includes three rotor blades 220. The one or more rotor blades 220 are positioned in proximity to the trailing edge 115 of the bottom horizontal plate 110 and to the trailing edge 144 of the top horizontal plate 140, rather than in proximity to the leading edges 143 and 114. The one or more rotor blades 220 may be connected through a driveshaft (e.g., the driveshaft 310, FIG. 3) adapted to transfer the rotational movement of the one or more rotor blades 220 to an electric generator 150 or other engine adapted to convert the rotational motion into electric power. It should be noted that the driveshaft may be either directly or indirectly connected to an electric generator.

In an embodiment, the electric generator 150 is placed between the left vertical plate 120 and the right vertical plate 130. According to another embodiment, the electric generator 150 is positioned between a top horizontal stabilizing plate 162 and a bottom horizontal stabilizing plate 163 such that the electric generator 150 is stabilized by the horizontal stabilizing plates 162 and 163s. According to another embodiment, the horizontal stabilizing plates 162 and 163 may be used for stabilizing the left vertical plate 120 and the right vertical plate 130.

The aperture 111 accepts therethrough the vertical shaft 210. The aperture 111 is adapted to receive the vertical shaft 210 in proximity to the leading edge 114 of the bottom horizontal plate 110, such that the yaw control device 100 rotates towards an approaching wind about a longitudinal axis of the vertical shaft 210.

It should be noted that the rotation speed of the one or more rotor blades 220 is affected by the yaw of the leading edges 114 and 143 relative to the wind. That is, when the leading edges 114 and 143 are adapted to continuously rotate towards the wind, exposure of the rotor blades 220 to the wind forces is maximized, thereby causing them to rotate more quickly, which optimizes the production of electric power. The resulting power production is higher compared to a fixed wind turbine, where a change in wind direction can cause deceleration of the rotor blades' speed and a decrease in energy production.

Figure 3:
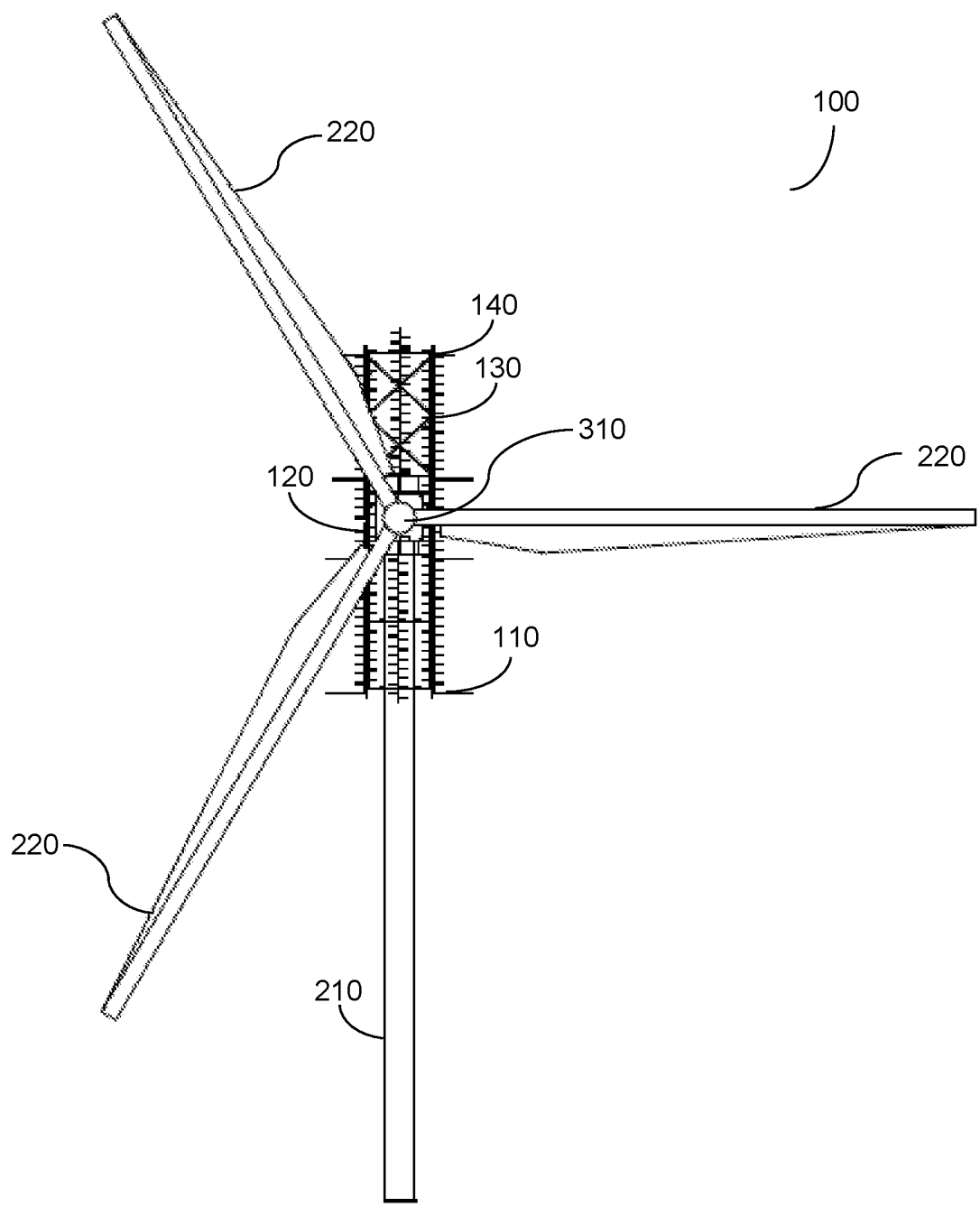
FIG. 3 is a rear view of a yaw control device with a wind turbine according to an embodiment.

Reference is now made to FIG. 3, which depicts a rear view of the yaw control device 100 according to an embodiment. In an embodiment, three rotor blades 220 are connected to an electric generator (e.g., the electric generator 150, FIG. 2) via a driveshaft 310. The driveshaft 310 is designed to transfer the rotational motion of the rotor blades 220 to an electric generator (e.g., the electric generator 150, FIG. 2) that is adapted to convert the rotational movement generated by the rotor blades 220 into electric energy. It should be noted that the driveshaft 310 may be directly or indirectly connected to an electric generator (e.g., the electric generator 150, FIG. 2). For example, in an embodiment, the driveshaft 310 is first connected to a gear box (not shown), which is connected to the electric generator (e.g., the electric generator 150, FIG. 2). A gear box, similar to a transmission, is a device adapted to change the rotational speed or torque of the driveshaft received directly from rotor blades (e.g., the rotor blades 220) to transfer the rotational energy most efficiently to a generator (e.g., the electric generator 150).

Figure 4:
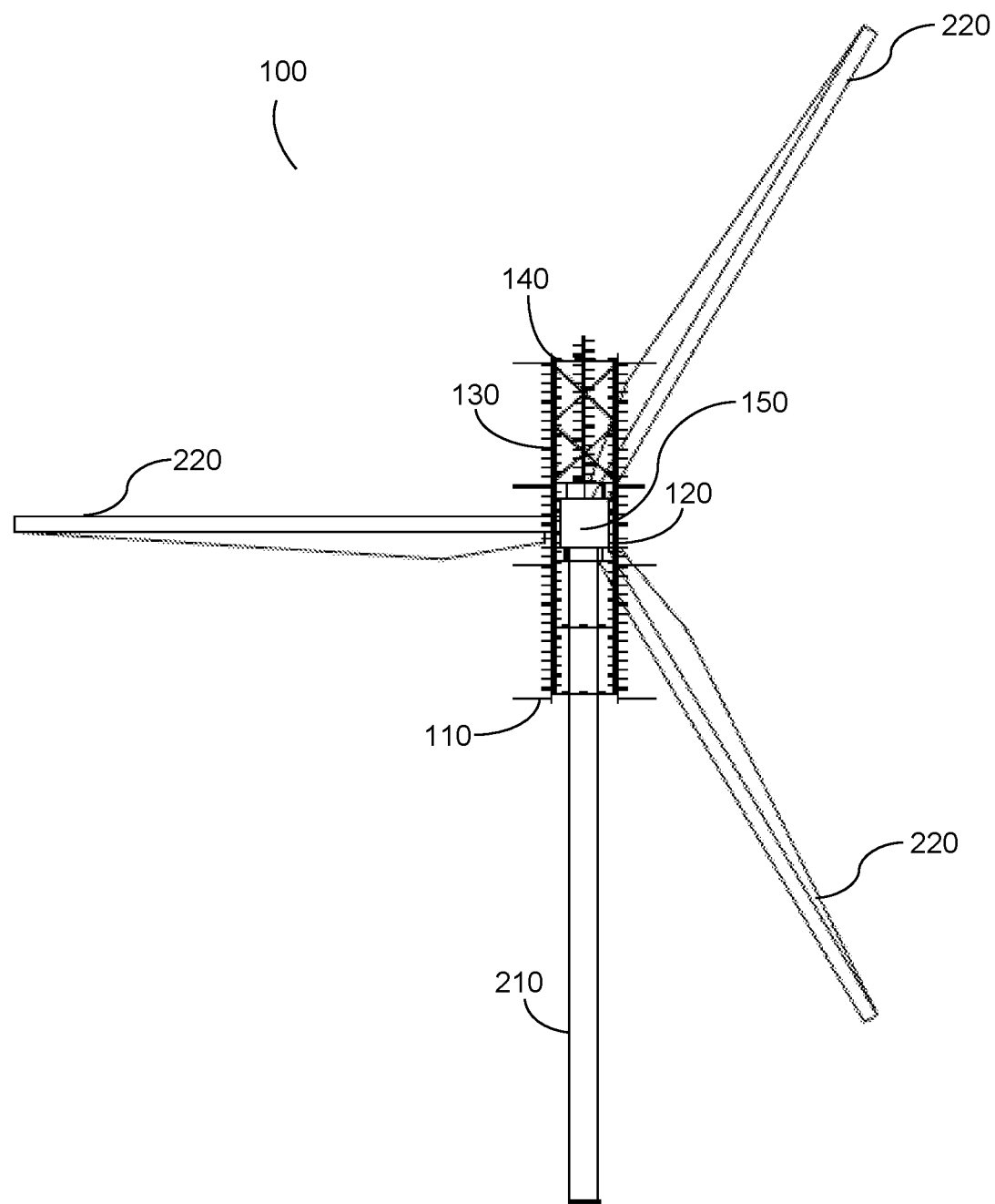
FIG. 4 is a front view of a yaw control device with a wind turbine according to an embodiment.

Reference is now made to FIG. 4, which shows a front view of the yaw control device 100 according to an embodiment. The right vertical plate 130 and the left vertical plate 120 are connected to the bottom horizontal plate 110 and to the top horizontal plate 140, as further discussed herein above.

Figure 5:
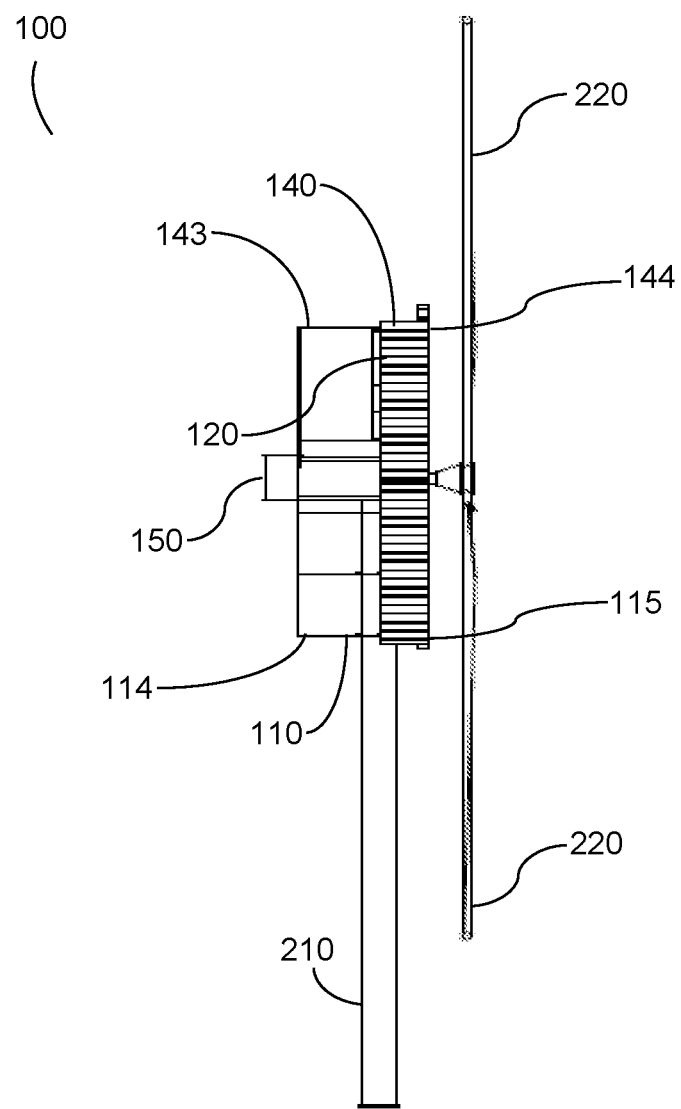
FIG. 5 is a left side view of a yaw control device with a wind turbine according to an embodiment.

Reference is now made to FIG. 5, which shows a left side view of the yaw control device 100 according to an embodiment. The left vertical plate 120 is shown. When wind is approaching from the left side of the yaw control device 120, the left vertical plate 120 and the right vertical plate 130 (shown at least in FIG. 6) rotate about the vertical shaft 210 such that the leading edge 114 of the bottom horizontal plate 110 and the leading edge 143 of the top horizontal plate 140 face the approaching wind coming from the left side of the yaw control device 100 as shown in FIG. 5. Thus, the leading edge 114 of the bottom horizontal plate 110 and the leading edge 143 of the top horizontal plate 140 are the first components of the wind turbine that the wind meets. As the air flow continues along the left vertical plate 120 and the right vertical plate 130, the wind moves toward the trailing edge 115 and the trailing edge 144 as well as to the rotor blades 220. Thus, the wind applies pressure to the rotor blades 220, which causes the rotor blades 220 to create rotational movement, allowing an internal electric generator (e.g., the electric generator 150) to generate electric energy.

Figure 6:
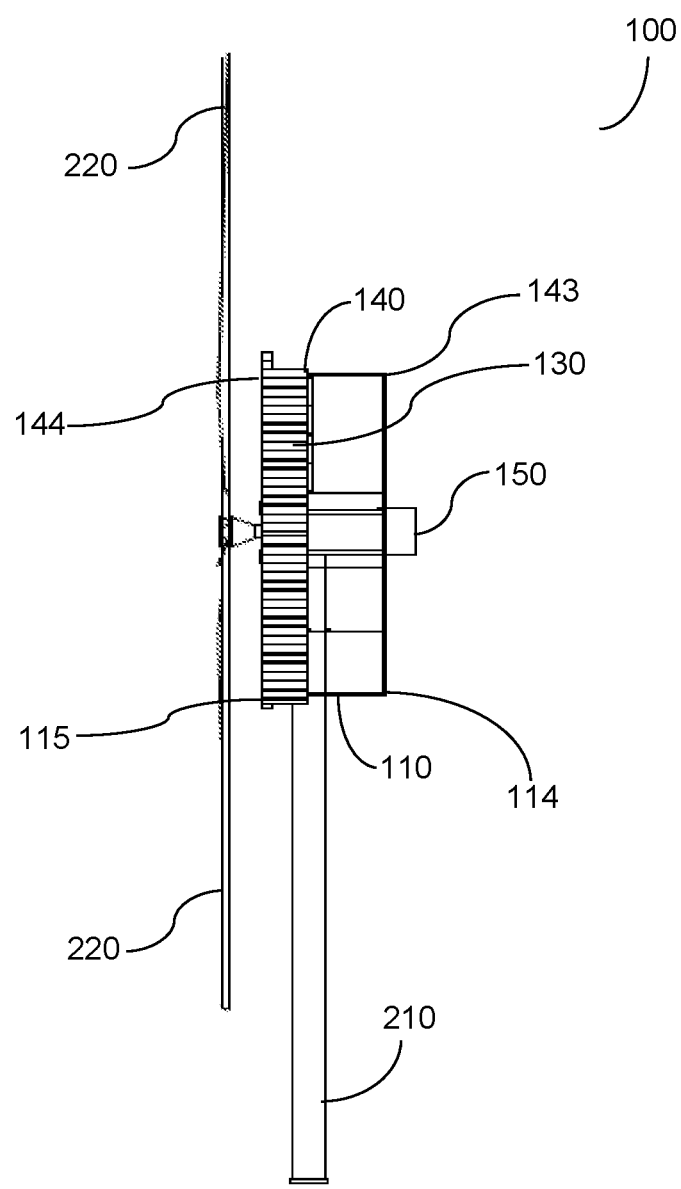
FIG. 6 is a right side view of a yaw control device with a wind turbine according to an embodiment.

When the wind direction changes, e.g., the wind begins approaching from the right side of the yaw control device 100 as shown in FIG. 6 instead approaching from the left side of the yaw control device 100 as shown in FIG. 5, the right vertical plate 130 and the left vertical plate 120 (shown at least in FIG. 5) rotate about the longitudinal axis of the vertical shaft 210 such that the leading edge 114 of the bottom horizontal plate 110 and the leading edge 143 of the top horizontal plate 140 face the approaching wind coming from the right side of the yaw control device as shown in FIG. 6. Thus, the leading edge 114 of the bottom horizontal plate 110 and the leading edge 143 of the top horizontal plate 140 are the first components of the wind turbine that the wind meets. As the air flow continues along the left vertical plate 120 and the right vertical plate 130, the wind moves toward the trailing edge 115 and the trailing edge 144 as well as to the rotor blades 220. Thus, the wind applies pressure to the rotor blades 220, which causes the rotor blades 220 to create rotational movement, allowing an internal electric generator (e.g., the electric generator 150) to generate electric energy.

It should be noted that the shape of the yaw control device 100 allows the yaw control device 100 to rapidly and automatically change the position of the left and right vertical plates (simultaneously), and therefore the position of the rotor blades 220 change, with respect to the wind, while maintaining the rotation motion and speed of the rotor blades 220. The left vertical plate 120 and the right vertical plate 130 are adapted to rotate simultaneously relative to the direction of the wind due to their shape and configuration. Because the left and right vertical plates are adapted to rotate about the axis of rotation of the vertical shaft 210, and the majority of surface area and mass of the left and right vertical plates are biased toward the trailing edges (e.g., the trailing edge 115 and the trailing edge 144) and the rotor blades 220 and away from the axis of rotation, the wind flow will cause both the left and right vertical plates to rotate such that the end of the left and right vertical plates, namely the rotor blades 220, face away from the direction of the wind. This rotation occurs without requiring additional electronic or mechanical assistance, and thus provides an efficient manner of ensuring that the rotor blades 220 are optimally exposed to the wind. Further, because internal gears or motors are not required, the left and right vertical plates can rotate without resistance, and thus more quickly than if controlled by external means. It should be noted that, although additional electronic or mechanical assistance as well as internal gears or motors are not required, some embodiments may utilize such components in order to further improve functioning of the yaw control device 100 without departing from the scope of the disclosure.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A yaw control device, comprising:
a bottom horizontal plate having an aperture, a first edge, a second edge, a third edge, and a fourth edge;
wherein the aperture is adapted to accept therethrough a vertical shaft, wherein the aperture is positioned between the first edge and the second edge of the bottom horizontal plate, wherein the aperture is positioned closer to the third edge of the bottom horizontal plate than to the fourth edge of the bottom horizontal plate;
a top horizontal plate having a first edge, a second edge, a third edge, and a fourth edge;
a first vertical plate having a bottom edge and an upper edge, wherein the bottom edge of the first vertical plate is attached to the first edge of the bottom horizontal plate, wherein the upper edge of the first vertical plate is attached to the first edge of the top horizontal plate;
a second vertical plate having a bottom edge and an upper edge, wherein the bottom edge of the second vertical plate is attached to the second edge of the bottom horizontal plate, wherein the upper edge of the second vertical plate is attached to the second edge of the top horizontal plate, wherein each of the first vertical plate and the second vertical plate has a first surface and a second surface;
a plurality of first extending plates extending from the first surface of the first vertical plate;
a plurality of second extending plates extending from the second surface of the first vertical plate;
a plurality of third extending plates extending from the first surface of the second vertical plate; and
a plurality of fourth extending plates extending from the second surface of the second vertical plate, wherein the first, second, third, and fourth extending plates increase friction between the first and second vertical plates and a wind in order to stabilize the first and second vertical plates with respect to the wind, wherein the third edge of the bottom horizontal plate and the third edge of the top horizontal plate are adapted to rotate about a longitudinal axis of the vertical shaft.

2. The yaw control device of claim 1, wherein each of the upper edge of the first vertical plate and the upper edge of the second vertical plate is positioned closer to the fourth edge of the top horizontal plate than to the third edge of the top horizontal plate.

3. The yaw control device of claim 1, further comprising:
at least one rotor blade positioned in proximity to the fourth edge of the bottom horizontal plate and the fourth edge of the top horizontal plate.

4. The yaw control device of claim 3, further comprising:
a driveshaft connected to the at least one rotor blade; and
an electric generator, wherein the electric generator is connected to the at least one rotor blade via the driveshaft.

5. The yaw control device of claim 4, wherein the electric generator is positioned between the first vertical plate and the second vertical plate.

6. The yaw control device of claim 3, further comprising:
a driveshaft connected to the at least one rotor blade; and
an electric generator, wherein the electric generator is connected to the at least one rotor blade via the driveshaft.

7. The yaw control device of claim 6, wherein the electric generator is positioned between the first vertical plate and the second vertical plate.

8. The yaw control device of claim 1, further comprising:
the vertical shaft, wherein the vertical shaft is positioned partially in the aperture of the bottom horizontal plate.

9. The yaw control device of claim 8, wherein the bottom horizontal plate includes a bearing that is at least partially surrounding the aperture, wherein the bearing of the bottom horizontal plate is positioned between the vertical shaft and the bottom horizontal plate such that the bottom horizontal plate is adapted to rotate about the longitudinal axis of the vertical shaft.

10. The yaw control device of claim 1, wherein each of the first vertical plate and the second vertical plate has a first surface and a second surface, further comprising:
at least one horizontal stabilizing plate, wherein the at least one horizontal stabilizing plate is positioned between the second surface of the second vertical plate and the second surface of the first vertical plate.

11. The yaw control device of claim 10, wherein the aperture is a first aperture, wherein the at least one horizontal stabilizing plate has a second aperture, wherein the second aperture is adapted to accept the vertical shaft therethrough.

12. The yaw control device of claim 1, wherein the first vertical plate is positioned closer to the fourth edge of the bottom horizontal plate than to the third edge of the bottom horizontal plate.

13. The yaw control device of claim 12, wherein the second vertical plate is positioned closer to the fourth edge of the bottom horizontal plate than to the third edge of the bottom horizontal plate.

14. A yaw control device, comprising:
a vertical shaft;
a bottom horizontal plate having a first aperture, a first edge, a second edge, a third edge, and a fourth edge;
wherein the first aperture is adapted to accept therethrough the vertical shaft, wherein the first aperture is positioned between the first edge and the second edge of the bottom horizontal plate, wherein the first aperture is positioned closer to the third edge of the bottom horizontal plate than to the fourth edge of the bottom horizontal plate;
a top horizontal plate having a first edge, a second edge, a third edge, and a fourth edge;
a first vertical plate having a bottom edge and an upper edge, wherein the bottom edge of the first vertical plate is attached to the first edge of the bottom horizontal plate, wherein the upper edge of the first vertical plate is attached to the first edge of the top horizontal plate;

a second vertical plate having a bottom edge and an upper edge, wherein the bottom edge of the second vertical plate is attached to the second edge of the bottom horizontal plate, wherein the upper edge of the second vertical plate is attached to the second edge of the top horizontal plate, wherein each of the first vertical plate and the second vertical plate has a first surface and a second surface;

at least one horizontal stabilizing plate, wherein the at least one horizontal stabilizing plate is positioned between the second surface of the second vertical plate and the second surface of the first vertical plate, wherein the at least one horizontal stabilizing plate has a second aperture, wherein the second aperture is adapted to accept the vertical shaft therethrough;

wherein the vertical shaft is positioned partially in the first aperture of the bottom horizontal plate, wherein the at least one horizontal stabilizing plate includes a first bearing and a second bearing, wherein the second bearing is at least partially surrounding the second aperture, wherein the second bearing is positioned between the vertical shaft and the at least one horizontal stabilizing plate such that the at least one horizontal stabilizing plate is adapted to rotate about the vertical shaft.

15. The yaw control device of claim 14, wherein each of the upper edge of the first vertical plate and the upper edge of the second vertical plate is positioned closer to the fourth edge of the top horizontal plate than to the third edge of the top horizontal plate.

16. The yaw control device of claim 14, further comprising:
   at least one rotor blade positioned in proximity to the fourth edge of the bottom horizontal plate and the fourth edge of the top horizontal plate.

17. The yaw control device of claim 14, further comprising:
   the vertical shaft, wherein the vertical shaft is positioned partially in the first aperture of the bottom horizontal plate.

18. The yaw control device of claim 17, wherein the bottom horizontal plate includes a bearing that is at least partially surrounding the first aperture, wherein the bearing of the bottom horizontal plate is positioned between the vertical shaft and the bottom horizontal plate such that the bottom horizontal plate is adapted to rotate about the longitudinal axis of the vertical shaft.

19. The yaw control device of claim 14, wherein the first vertical plate is positioned closer to the fourth edge of the bottom horizontal plate than to the third edge of the bottom horizontal plate.

* * * * *